US006949612B2

(12) United States Patent
Agapiou et al.

(10) Patent No.: US 6,949,612 B2
(45) Date of Patent: Sep. 27, 2005

(54) PROCESSES FOR TRANSITIONING BETWEEN METALLOCENE AND ZIEGLER-NATTA POLYMERIZATION CATALYSTS

(75) Inventors: Agapios Kyriacos Agapiou, Humble, TX (US); Robert Olds Hagerty, La Porte, TX (US); F. David Hussein, Cross Lanes, WV (US); Michael Elroy Muhle, Kingwood, TX (US); Richard B. Pannell, Kingwood, TX (US); Kathryn Ann Russell, Seabrook, TX (US); Robert Lynn Santana, Baytown, TX (US); X. Simon Zhang, London (GB)

(73) Assignee: Univation Technologies, LLC, Houston, TX (US)

(*) Notice: Subject to any disclaimer, the term of this patent is extended or adjusted under 35 U.S.C. 154(b) by 75 days.

(21) Appl. No.: 10/715,813

(22) Filed: Nov. 18, 2003

(65) Prior Publication Data

US 2004/0181016 A1 Sep. 16, 2004

Related U.S. Application Data

(60) Provisional application No. 60/437,697, filed on Dec. 31, 2002.

(51) Int. Cl.[7] .................................................. C08F 2/38
(52) U.S. Cl. .......................... 526/84; 526/83; 526/86; 526/901
(58) Field of Search ............................ 526/83, 84, 86, 526/901

(56) References Cited

U.S. PATENT DOCUMENTS

| | | | |
|---|---|---|---|
| 4,306,044 A | 12/1981 | Charsley | 526/84 |
| 4,460,755 A | 7/1984 | Williams et al. | 526/84 |
| 4,701,489 A | 10/1987 | Hughes et al. | 524/349 |
| 4,834,947 A | 5/1989 | Cook et al. | 422/117 |
| 5,227,438 A | 7/1993 | Rebhan | 526/82 |
| 5,270,408 A | 12/1993 | Craddock, III et al. | 526/82 |
| 5,371,053 A | 12/1994 | Agapiou et al. | 502/56 |
| 5,442,019 A | 8/1995 | Agapiou et al. | 526/82 |
| 5,672,665 A | 9/1997 | Agapiou et al. | 526/82 |
| 5,672,666 A | 9/1997 | Muhle et al. | 526/82 |
| 5,753,786 A | 5/1998 | Agapiou et al. | 526/82 |
| 6,245,868 B1 * | 6/2001 | Agapiou et al. | 526/88 |
| 6,284,849 B1 | 9/2001 | Almquist et al. | 526/82 |
| 6,359,084 B1 | 3/2002 | Herzog et al. | 526/84 |

FOREIGN PATENT DOCUMENTS

| | | |
|---|---|---|
| EP | 0116917 A1 | 8/1984 |
| EP | 0471479 B1 | 2/1992 |
| EP | 0829491 A2 | 3/1998 |
| WO | WO 92/14766 | 9/1992 |
| WO | WO 98/30599 | 7/1998 |

* cited by examiner

*Primary Examiner*—Fred Teskin
(74) *Attorney, Agent, or Firm*—Osborne K. McKinney; Kevin M. Faulkner

(57) ABSTRACT

Processes for transitioning among polymerization catalyst systems, preferably catalyst systems that are incompatible with each other. In particular, the processes relate to transitioning from olefin polymerizations utilizing metallocene catalyst systems to olefin polymerizations utilizing traditional Ziegler-Natta catalyst systems.

14 Claims, No Drawings

PROCESSES FOR TRANSITIONING BETWEEN METALLOCENE AND ZIEGLER-NATTA POLYMERIZATION CATALYSTS

This application claims benefit of U.S. Provisional 60/437,697 filed Dec. 31, 2002.

FIELD OF INVENTION

This invention relates to processes for transitioning among polymerization catalyst systems, preferably catalyst systems that are incompatible with each other. Particularly, the invention relates to processes for transitioning among olefin polymerization reactions utilizing metallocene catalyst systems and Ziegler-Natta catalyst systems.

BACKGROUND OF THE INVENTION

During the production of olefin polymers in a commercial reactor it is often necessary to transition from one type of catalyst system producing polymers having certain properties and characteristics to another catalyst system capable of producing polymers of different chemical and/or physical attributes. Transitioning between similar Ziegler-Natta catalyst systems, or compatible catalyst systems, for instance, generally takes place easily. However, where the catalyst systems are incompatible or of different types the process is typically complicated. For example, when transitioning between two incompatible catalyst systems such as a Ziegler-Natta catalyst system and a metallocene catalyst system, it has been found that some of the components of the Ziegler-Natta catalyst system act as poisons to the metallocene catalyst system. Consequently, the components of the Ziegler-Natta catalyst system prevent the metallocene catalyst system from promoting polymerization.

In the past, to accomplish an effective transition between incompatible catalysts, the first catalyzed olefin polymerization process was stopped by various techniques known in the art. The reactor was then emptied, recharged and a second catalyst system was introduced into the reactor. Such catalyst conversions are time consuming and costly because of the need for a reactor shut-down for an extended period of time during transition.

It would be highly advantageous to have a process for transitioning between incompatible catalysts, without the need for halting the polymerization reaction, emptying the reactor to rid it of the original catalyst system and restarting the polymerization reaction with another catalyst system. In addition, it would be advantageous if the process for transitioning could reduce the amount of off-grade material produced during the transition process, reduce the transition time, increase the robustness and stability of the transition process and avoid the need to open the reactor to charge the seed bed.

SUMMARY OF THE INVENTION

The present invention relates to a process for transitioning from a first polymerization reaction conducted in the presence of a first catalyst to a second polymerization reaction conducted in the presence of a second catalyst wherein the first and second catalysts are incompatible. The process comprises discontinuing the introduction of the first catalyst into a reactor wherein the first catalyst comprises a metallocene catalyst; introducing and dispersing in the reactor at least one deactivating agent selected from the group consisting of oxygen, air, carbon monoxide, carbon dioxide, water, oleic acid, and ammonia in an amount sufficient to substantially halt the first polymerization reaction; purging the reactor with an inert gas to substantially remove unconsumed deactivating agent from the reactor; and introducing the second catalyst into the reactor wherein the second catalyst comprises a traditional Ziegler-Natta catalyst.

According to a preferred embodiment of the present invention, the polymerization process is conducted by the essentially continuous passage of monomer gases through the polymerization zone of a gas phase fluidized bed reactor which contains a fluidized bed of polymer particles.

According to another preferred embodiment, a transition agent is introduced in the reactor to aid in reducing static electricity buildup, temperature gradients, bed height fluctuations, and other instabilities ordinarily encountered when transitioning from one catalyst system to another, especially where the second catalyst system is incompatible with the first catalyst system. Still more preferably, the transition agent is selected from the group consisting of alkoxylated amines and alkoxylated amides. And more preferably still, the transition agent is ethoxylated stearyl amine, which may be optionally supported on a solid material.

In another preferred embodiment of the present invention, the deactivating agent comprises oxygen in an amount approximately equal to or greater than 1 molar equivalent based on the gram-atoms of active metal in the first catalyst.

In another preferred embodiment of the present invention, the step of introducing and dispersing a deactivating agent and the step of purging the reactor with an inert gas are repeated one or more times. The deactivating agents employed have varying degrees of ability to permanently halt the polymerization reaction and are sometimes described as "reversible" or "irreversible," as those terms are used in U.S. Pat. No. 5,442,019, which refers to reversible and irreversible catalyst killers, the disclosure of which is incorporated herein in its entirety. It is within the scope of the present invention to introduce reversible deactivating agents into the reactor, followed by irreversible deactivating agents.

In yet another preferred embodiment of the present invention, the process further comprises introducing into the reactor, prior to the introduction of the second catalyst, a passivating agent in an amount to effectively passivate the reactor such as by scavenging any residual compounds capable of causing further polymerization and/or inhibiting the activity of the second catalyst system. In a still more preferred embodiment, the passivating agent comprises an organometallic compound represented by the formula $BX_3$ or $AlR_{(3-a)}X_a$, where R is a branched or straight chain alkyl, cycloalkyl, heterocycloalkyl, aryl, or a hydride radical having from 1 to 30 carbon atoms, X is a halogen, and a is 0, 1, or 2. In a still more preferred embodiment, the passivating agent comprises triethylaluminum.

According to another preferred embodiment of the present invention, when water is present in the reactor, the process further comprises purging the reactor until the concentration of water vapor in the reactor is less than or equal to 100 parts per million by weight, based on the weight of the seedbed, before introducing and dispersing the second catalyst into the reactor, and still more preferably, the purging of water vapor is continued until the concentration of water vapor is less than or equal to 20 parts per million by reactor volume.

In another embodiment of the present invention, a traditional Ziegler-Natta catalyst system without the introduction of an activator or co-catalyst therefor is used to halt the first polymerization reaction, whereupon, after termination of the first polymerization reaction, an activator or co-catalyst of the Ziegler-Natta catalyst system is introduced in an amount sufficient to effectively activate the Ziegler-Natta catalyst.

In a more preferred embodiment of the present invention, the activator or co-catalyst for the second catalyst comprises an organometallic compound represented by the formula $BX_3$ or $AlR_{(3-a)}X_a$, where R is a branched or straight chain alkyl, cycloalkyl, heterocycloalkyl, aryl or a hydride radical having from 1 to 30 carbon atoms, x is a halogen, and a is 0, 1, or 2, and still more preferably, the activator or co-catalyst for the second catalyst comprises triethylaluminum.

The invention particularly relates to the discovery that certain materials are effective as a deactivating agent for a metallocene catalyzed polymerization reaction whereas the materials are ineffective for deactivating traditional Ziegler-Natta catalyst systems or exhibit different deactivating characteristics in regard to traditional Ziegler-Natta catalyst systems than for metallocene catalyst systems.

DETAILED DESCRIPTION

The present invention relates to processes for transitioning between catalysts and/or catalyst systems to convert a reactor from producing one type of product to another with minimal reactor down-time.

In particular, preferred processes are drawn to transitioning between Ziegler-Natta catalysts/catalyst systems and metallocene catalysts/catalyst systems. For the purpose of this patent specification and appended claims the terms "catalyst" and "catalyst system" shall be used interchangeably and shall have the identical meaning.

The processes of the present invention preferably are used in gas phase, solution phase, slurry or bulk phase polymerization processes. Most preferably, the processes of the present invention are used in a gas phase polymerization process in a fluidized bed reactor.

In a typical continuous gas fluidized bed polymerization process for the production of polymer from monomer, a gaseous stream comprising monomer is passed through a fluidized bed reactor in the presence of a catalyst under reactive conditions. A polymer product is withdrawn from the fluidized bed reactor. Also withdrawn from the reactor is a cycle gas stream, which is continuously circulated and usually cooled. The cycle gas stream is returned to the reactor together with additional monomer sufficient to replace the monomer consumed in the polymerization reaction. For detailed descriptions of gas phase fluidized bed polymerization processes, see U.S. Pat. Nos. 4,543,399, 4,588,790, 5,028,670, 5,352,769 and 5,405,922, the disclosures of which are hereby fully incorporated herein by reference.

For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2–15 carbon atoms, for example, ethylene, propylene, butene-1, pentene-1, 4-methylpentene-1, hexene-1, octene-1, decene-1 and cyclic olefins such as styrene. Other monomers can include polar vinyl, diene, norbornene, acetylene and aldehyde monomers. In the preferred embodiments of the present invention, the gas composition contains ethylene and at least one alpha-olefin having 3 to 15 carbon atoms, most preferably is butene-1, hexene-1 or octene-1.

Typically, the gas composition also contains an amount of hydrogen to control the melt index of the polymer to be produced. In typical circumstances the gas also contains an amount of a dew point increasing component with the balance of the gas composition made up of non-condensable inerts, for example, nitrogen.

Depending on the second catalyst to be introduced into the reactor the gas concentrations of the various components of the gas composition can be altered, for instance, the comonomer and hydrogen gas concentrations can be increased or decreased.

When transitioning between compatible catalysts there are typically only slight differences in the performance of the catalysts in regard to hydrogen response and comonomer incorporation. Conversely, when transitioning between incompatible catalysts, the interactions are not straightforward. For example, Ziegler-Natta and metallocene catalysts have extremely different responses to molecular weight regulators, such as hydrogen and comonomer, which makes these catalysts incompatible. Any traces of active Ziegler-Natta catalyst will produce very high molecular weight product under metallocene catalyst reactor conditions. Furthermore, particularly in a continuous transition process, the interaction between two incompatible catalysts may lead to the production of high levels of small particles less than about 100 microns that are referred to as "fines". Fines can induce operability problems in the reactor and/or fouling and sheeting incidents.

During the transition from a first catalyst to a second catalyst, particularly in a continuous process, adverse interactions or contact of the two catalysts typically occur. For compatible catalysts, the transition normally occurs by discontinuing the feed of the first catalyst while commencing the feed of the second catalyst. Typically it takes many hours until the first catalyst is entirely consumed. So, for a relatively long period of time the resin produced is a mixture from both the first and the second catalyst.

Compatible catalysts are those catalysts having similar kinetics of termination and insertion of monomer and comonomer(s) and/or do not detrimentally interact with each other.

For the purpose of this patent specification and appended claims the term "incompatible catalysts" shall refer to and mean catalysts that satisfy one or more of the following:
1) those catalysts that when present together reduce the activity of at least one of the catalysts by greater than 50%;
2) those catalysts that under the same reactive conditions produce polymers such that one of the polymers has a molecular weight that is more than twice the molecular weight of the other polymer; and
3) those catalysts that differ in comonomer incorporation or reactivity ratio under the same conditions by more than about 30%.

As noted above, preferred processes of the present invention are applicable to, transitioning between a metallocene catalyst system and a Ziegler-Natta catalyst system. According to this process, in a steady state operation with a metallocene catalyst, the first polymerization reaction is halted by first discontinuing the introduction to the reactor of the metallocene catalyst, followed by introducing and dispersing in the reactor at least one deactivating agent selected from the group consisting of oxygen, air, carbon monoxide, carbon dioxide, water, oleic acid, and ammonia in an amount sufficient to substantially halt the first polymerization reaction, then purging the reactor with an inert gas to substantially remove unconsumed deactivating agent from the reactor, and finally introducing the second catalyst into the reactor wherein the second catalyst comprises a traditional Ziegler-Natta catalyst.

According to a preferred embodiment of the present invention, the polymerization process is conducted by the essentially continuous passage of monomer gases through the polymerization zone of a gas phase fluidized bed reactor which contains a fluidized bed of polymer particles.

According to another preferred embodiment, a transition agent is introduced in the reactor to aid in reducing static electricity buildup, temperature gradients, bed height fluctuations, and other instabilities that are typically encountered when transitioning from one catalyst system to another, especially where the second catalyst system is incompatible with the first catalyst system. Still more preferably, the transition agent is selected from the group consisting of alkoxylated amines and alkoxylated amides, and more preferably still, the transition agent is ethoxylated stearyl amine, which may be optionally supported on a solid material such as silica.

In another preferred embodiment of the present invention, the deactivating agent comprises oxygen in an amount approximately equal to or greater than 1 molar equivalent based on the gram-atoms of active metal in the first catalyst.

In another preferred embodiment of the present invention, the step of introducing and dispersing a deactivating agent and the step of purging the reactor with an inert gas are repeated one or more times. The deactivating agents employed have varying degrees of ability to permanently halt the polymerization reaction and are sometimes described as "reversible" or "irreversible," as those terms are used in U.S. Pat. No. 5,442,019, which refers to reversible and irreversible catalyst killers, the disclosure of which is incorporated herein in its entirety. It is within the scope of the present invention to introduce reversible deactivating agents into the reactor, followed by irreversible deactivating agents.

In yet another preferred embodiment of the present invention, the process further comprises introducing into the reactor, prior to the introduction of the second catalyst, a passivating agent in an amount to effectively passivate the reactor by scavenging any residual compounds capable of causing further polymerization. Still more preferably, the passivating agent comprises an organometallic compound represented by the formula $BX_3$ or $AlR_{(3-a)}X_a$, where R is a branched or straight chain alkyl, cycloalkyl, heterocycloalkyl, aryl, or a hydride radical having from 1 to 30 carbon atoms, X is a halogen, and a is 0, 1, or 2. In a still more preferred embodiment, the passivating agent comprises triethylaluminum.

According to another preferred embodiment of the present invention, when water is present in the reactor, the process further comprises, purging the reactor until the concentration of water vapor in the reactor is less than or equal to 100 parts per million by weight, based on the weight of the seedbed, before introducing and dispersing the second catalyst into the reactor, and still more preferably, the purging of water vapor is continued until the concentration of water vapor is less than or equal to 20 parts per million by reactor volume.

In another embodiment of the present invention, a traditional Ziegler-Natta catalyst system without the introduction of an activator or co-catalyst therefor is used to terminate the first polymerization reaction, whereupon, after termination of the first polymerization reaction, an activator or co-catalyst of the Ziegler-Natta catalyst system is introduced in an amount sufficient to effectively activate the Ziegler-Natta catalyst. In a more preferred embodiment of the present invention, the activator or co-catalyst for the second catalyst comprises an organometallic compound represented by the formula $BX_3$ or $AlR_{(3-a)}X_a$, where R is a branched or straight chain alkyl, cycloalkyl, heterocycloalkyl, aryl or a hydride radical having from 1 to 30 carbon atoms, x is a halogen, and a is 0, 1, or 2, and still more preferably, the activator or co-catalyst for the second catalyst comprises triethylaluminum.

The present invention contemplates various embodiments of the process claimed, which are non-limiting. Preferably, the polymerization process is a continuous phase polymerization process conducted in a fluidized bed reactor.

All polymerization catalysts including conventional-type transition metal catalysts and bulky ligand metallocene-type catalysts are suitable for use in the processes of the present invention. The following is a non-limiting discussion of the various polymerization catalysts useful in the invention.

Conventional-Type Transition Metal Catalysts

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741, the disclosures of which are hereby fully incorporated herein by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Groups 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, the disclosures of which are hereby fully incorporated herein by reference. Catalysts derived from Mg/Ti/Cl/THF are particularly preferred, which are well known to those of ordinary skill in the art. One non-limiting example of the general method of preparation of such a catalyst includes the following: dissolve $TiCl_4$ in THF, reduce the compound to $TiCl_3$ using Mg, add $MgCl_2$, and remove the solvent.

British Patent Application No. 2,105,355 and U.S. Pat. No. 5,317,036, the disclosures of which are hereby incorporated herein by reference, describe various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where "Bu" means "butyl" and $VO(OC_2H_5)_3$; vanadium tetra-halide and vanadium alkoxy halides such as $VCl_4$ and $VCl_3$ (OBu); vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR, where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, the disclosures of which are hereby fully incorporated herein by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437, the disclosures of which are hereby fully incorporated herein by reference.

For more details on Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, 5,070,055, the disclosures of which are hereby incorporated herein by reference.

Typically, these conventional-type transition metal catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M^3M^4_v X^2_c R^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, the disclosures of which are hereby fully incorporated herein by reference.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligand is η-bonded to the metal atom, most preferably $η^5$-bonded to the metal atom.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B M Q_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of t-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethyl-germyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen R substituents include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene-type catalyst compound.

In one embodiment, the bulky ligand metallocene-type catalyst compounds of the invention include those of formula (I) where $L^A$ and $L^B$ are bridged to each other by a bridging group, A, such that the formula is represented by $$L^A A L^B M Q_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by $R'_2C$, $R'_2Si$, $R'_2SiR'_2Si$, $R'_2Ge$, $R'P$, where R' is independently a radical group which is a hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalyst compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (II) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably, J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D MQ_2(YZ)X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$ (YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233,049, 5,744,417, and 5,856,258, the disclosures of which are hereby incorporated herein by reference.

In another embodiment, the bulky ligand metallocene-type catalyst compounds are those complexes known as transition metal catalysts based on bidentate ligands containing pyridine or quinoline moieties, such as those described in U.S. Pat. Nos. 6,103,357 and 6,103,620, the disclosures of which are hereby incorporated herein by reference. In another embodiment, the bulky ligand metallocene-type catalyst compounds are those described in PCT publications WO 99/01481 and WO 98/42664, the disclosures of which are hereby fully incorporated herein by reference.

In one embodiment, the bulky ligand metallocene-type catalyst compound is represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur, then Z is optional. In another embodiment, where X is nitrogen or phosphorous, then Z is present. In an embodiment, Z is preferably an aryl group, more preferably a substituted aryl group.

Other Bulky Ligand Metallocene-Type Catalyst Compounds

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", *J. Am. Chem. Soc.* 1995, 117, pp. 6414–6415 and Johnson, et al., "Copolymerization of Ethylene and Propylene with Functionalized Vinyl Monomers by Palladium(II) Catalysts", *J. Am. Chem. Soc.*, 1996, 118, pp. 267–268, and WO 96/23010, WO 99/02472, U.S. Pat. Nos. 5,852,145, 5,866,663 and 5,880,241, the disclosures of which are hereby fully incorporated herein by reference. These complexes can be either dialkyl ether adducts, or alkylated reaction products of the described dihalide complexes that can be activated to a cationic state by the activators of this invention described below.

Also included as bulky ligand metallocene-type catalysts are those diimine based ligands of Group 8 to 10 metal compounds disclosed in PCT publications WO 96/23010 and WO 97/48735 and Gibson, et al., *Chem. Comm.*, pp. 849–850 (1998), the disclosures of which are hereby incorporated herein by reference.

Other bulky ligand metallocene-type catalysts are those Group 5 and 6 metal imido complexes described in EP-A2-0 816 384 and U.S. Pat. No. 5,851,945, the disclosures of which are hereby incorporated herein by reference. In addition, bulky ligand metallocene-type catalysts include bridged bis(arylamido) Group 4 compounds described by D.

H. McConville, et al., *Organometallics* 1195, 14, pp. 5478–5480, the disclosure of which is hereby incorporated herein by reference. Other bulky ligand metallocene-type catalysts are described as bis(hydroxy aromatic nitrogen ligands) in U.S. Pat. No. 5,852,146, the disclosure of which is hereby incorporated herein by reference. Other metallocene-type catalysts containing one or more Group 15 atoms include those described in WO 98/46651, the disclosure of which is hereby incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, the disclosure of which is hereby incorporated herein by reference) and mixtures thereof.

In order to provide a better understanding of the present invention, the following examples are offered as related to actual tests performed in the practice of the invention.

EXAMPLES

Example 1

A 2.1 liter stirred autoclave reactor, running at steady state conditions with a metallocene catalyst system (i.e., bis(1,3-methyl butyl cyclopentadienyl) zirconium dichloride with methylalumoxane as the co-catalyst) and producing a polymerization product having a 24 dg/min melt index and 0.924 g/cc density was used to conduct a transition from a metallocene catalyst system to a Ziegler-Natta catalyst system. The conditions for the metallocene catalyzed polymerization were as follows:

| | |
|---|---|
| Metallocene Catalyst | Zr (wt %) 0.35 |
| Temperature (° C.) | 86 |
| Pressure (psi) | 314.6 |
| Ethylene (mole %) | 32.8 |
| Hydrogen (mole %) | 0.050 (502 ppm) |
| Butene (mole %) | 2.1 |
| Bed Weight (Kg) | 135 |
| Production Rate (Kg/Hr) | 37 |
| Catalyst Productivity (Kg/Kg) | 3500 |
| Bulk Density (g/cc) | 0.35 |
| Average Particle Size (microns) | 590 |
| Fines (% less than 120 microns) | 3.28 |

With regard to the above steady-state polymerization with a metallocene catalyst system, the following is a non-limiting description of a transition procedure from the metallocene catalyst system to a Ziegler-Natta catalyst system that is within the scope of the present invention:

1. The metallocene catalyst feed to the reactor was stopped.
2. $CO_2$ was injected into the reactor at about 400–500 ppm by volume, as a metallocene catalyst deactivating agent.
3. Once the reaction began to fall off, all feeds to the reactor were blocked-in, including the monomer and recycle stream.
4. It was confirmed that the polymerization reaction had been terminated, for example, by measuring the temperature change within the reactor.
5. The product discharge was turned off.
6. Hydrocarbons were removed from the reactor (while maintaining the reactor at 86° C.) by purging with dry nitrogen at a velocity of 2.25 ft/sec. until the lower explosive limit (LEL) was zero.
7. During the nitrogen purging, the metallocene catalyst supply vessels were removed and it was confirmed that no residual metallocene catalyst was left in the feeder lines.
8. Once the LEL was zero, the reactor was vented and depressurized to 50 psig by stopping the nitrogen purge and blocking in nitrogen to the reactor to maintain 50 psig reactor pressure.
9. The reactor was air scavenged with the reactor at 50 psig, by slowly increasing reactor pressure to 100 psig in 5-psig increments using only plant air and holding for five minutes after each incremental increase while monitoring all reactor temperatures. If a significant temperature increase occurred during air scavenging, water would have been injected into the reactor and the transition would have been aborted.
10. The reactor was air scavenged a total of four times by repeating depressurizing the reactor back to 50 psig and incrementally increasing reactor pressure to 100 psig.
11. Once the air scavenging was complete (wherein the oxygen rate is 5000 ppm based on seedbed weight), the reactor was purged with dry nitrogen 10 times (wherein depressurization to 55 psig, then pressurization to 115 psig and depressurization back to 55 psig was taken as one pressure purge) to vent all air and provide an air-free reactor.
12. The reactor was passivated with triethylaluminum (as described in U.S. Pat. No. 5,106,926, the disclosure of which is incorporated herein by reference) using a 10 weight percent solution of triethylaluminum in isopentane at a rate of about 3 ppm based on seedbed weight and the reactor was prepared for a Ziegler-Natta catalyst startup.

Example 2

Using the same metallocene catalyst system, reactor and substantially the same steady state conditions as described above for Example 1, the following transition was conducted:

1. While operating at a bed temperature of about 86° C., a cycle gas velocity of about 2.25 ft/sec, a total gas pressure of about 300 psig and a bed weight of about 550 lbs, the metallocene catalyst feed was stopped and the compressor allowed to remain running during the transition.
2. All monomer feeds were blocked in, the product discharge turned off, and the reactor contents allowed to recirculate (recycle).
3. About 50 cc's of $H_2O$ were injected into the reactor at reactor pressure and the reactor was slowly vented to reach about 60 psig over a 2 hour 40 minute time span. Reactor temperatures changes were monitored to ensure the polymerization reaction had been halted by the end of the time span.
4. The reactor was purged with dry nitrogen until the LEL was less than 0.1% by volume.
5. During the nitrogen purging, the metallocene catalyst supply vessels were removed, it was ensured that no residual catalyst was left in the feeder lines, and the triethylaluminum pumps were prepared for triethylaluminum injection.
6. Once the LEL was less than 0.1% by reactor volume, nitrogen purging was stopped, the nitrogen was blocked in, the reactor was vented/depressurized to 50 psig, and the atmospheric vent was closed.
7. The reactor was air scavenged with the reactor at 50 psig, by slowly increasing reactor pressure to 100 psig by 5-psig increments using only plant air and holding for five minutes after each incremental increase while monitoring all reactor temperatures. If a significant temperature increase had occurred during air scavenging, water would have been injected into the reactor and the transition would have been aborted, i.e. air feed would have been stopped and the restart procedure at step 3 above would have been restarted.

8. The reactor was air scavenged a total of four times by repeating venting to depressurize the reactor back to 50 psig and incrementally increasing reactor pressure (with vent closed) to 100 psig with air three additional times.

9. After no exotherm was observed, the reactor was pressure purged 10 times to atmosphere using a 50 psig −80 psig −50 psig sequence with plant air to nitrogen free the reactor. When air purges were complete, the air was blocked in and air was allowed to circulate for 2 hours.

10. When air circulation was complete, 10 pressure purges were performed using a 50 psig −120 psig −50 psig sequence with dry nitrogen to a remove air and any moisture from the reactor system. Nitrogen pressure purging was repeated until the air/oxygen level was nil and the moisture level was less than 20 ppm based on bed weight for at least two consecutive hours of runtime.

11. The reactor was passivated with triethylaluminum (as described in U.S. Pat. No. 5,106,926, the disclosure of which is incorporated herein by reference) using a 10 weight percent solution of triethylaluminum in isopentane at a rate of about 3 ppm based on bed weight. The reactor was prepared for a Ziegler-Natta catalyst startup wherein conditions of reactor pressure and reactant concentrations (including hydrogen, if any) were built to near target levels before the Ziegler-Natta catalyst feed to the reactor was started, and the bed weight was allowed to gradually increase after the introduction of the Ziegler-Natta catalyst. The reaction was observed to increase as indicated by reactor temperature changes.

While the present invention has been described and illustrated by reference to particular embodiments, it will be appreciated by those of ordinary skill in the art that the invention lends itself to variations not necessarily illustrated herein. For example, it is not beyond the scope of this invention to transition between one or more mixed catalysts to one or more incompatible mixed catalysts and vice-versa. For this reason, then, reference should be made solely to the appended claims for purposes of determining the true scope of the present invention.

What is claimed is:

1. A process for transitioning from a first polymerization reaction conducted in the presence of a first catalyst to a second polymerization reaction conducted in the presence of a second catalyst wherein the first and second catalysts are incompatible, the process comprising:
   (a) discontinuing the introduction of the first catalyst into a reactor having a bed of polymer, wherein the first catalyst comprises a metallocene catalyst;
   (b) introducing and dispersing in the reactor at least one deactivating agent selected from the group consisting of oxygen, air, carbon monoxide, carbon dioxide, water, oleic acid, and ammonia in an amount sufficient to substantially halt the first polymerization reaction;
   (c) purging the reactor with an inert gas to substantially remove unreacted deactivating agent from the reactor; and
   (d) introducing the second catalyst into the reactor wherein the second catalyst comprises a traditional Ziegler-Natta catalyst;
      wherein water is present in the reactor and prior to the introduction and dispersion of the second catalyst in the reactor, the reactor is purged until the concentration of water vapor in the reactor is less than or equal to 100 parts per million by weight based on the weight of the bed.

2. The process of claim 1 wherein the first polymerization reaction and the second polymerization reaction comprise a gas phase process.

3. The process of claim 1 wherein the first polymerization reaction and the second polymerization reaction are conducted in a fluidized bed reactor.

4. The process of claim 1 wherein the process is continuous.

5. The process of claim 1 further comprising introducing a transition agent in the reactor.

6. The process of claim 5 wherein the transition agent is selected from the group consisting of alkoxylated amines and alkoxylated amides.

7. The process of claim 6 wherein the transition agent comprises ethoxylated stearyl amine.

8. The process of claim 7 wherein the transition agent is supported on a solid carrier material.

9. The process of claim 1 wherein the deactivating agent comprises oxygen in an amount approximately equal to or greater than 1 molar equivalent based on the gram-atoms of active metal in the first catalyst.

10. The process of claim 1 wherein steps (b) and (c) are repeated at least one time.

11. The process of claim 1 further comprising introducing in the reactor, prior to the introduction of the second catalyst, a passivating agent in an amount sufficient to effectively passivate the reactor.

12. The process of claim 11 wherein the passivating agent comprises an organometallic compound represented by the formula $BX_3$ or $AlR_{(3-a)}X_a$, where R is a branched or straight chain alkyl, cycloalkyl, heterocycloalkyl, aryl, or a hydride radical having from 1 to 30 carbon atoms, X is a halogen, and a is 0, 1, or 2.

13. The process of claim 12 wherein the passivating agent comprises triethylaluminum.

14. The process of claim 1 wherein water is present in the reactor and prior to the introduction and dispersion of the second catalyst in the reactor, the reactor is purged until the concentration of water vapor in the reactor is less than or equal to 20 parts per million by reactor volume.

* * * * *